No. 885,758. PATENTED APR. 28, 1908.
Z. T. JOB.
COTTON SEED HULLER.
APPLICATION FILED SEPT. 12, 1906.
2 SHEETS—SHEET 1.
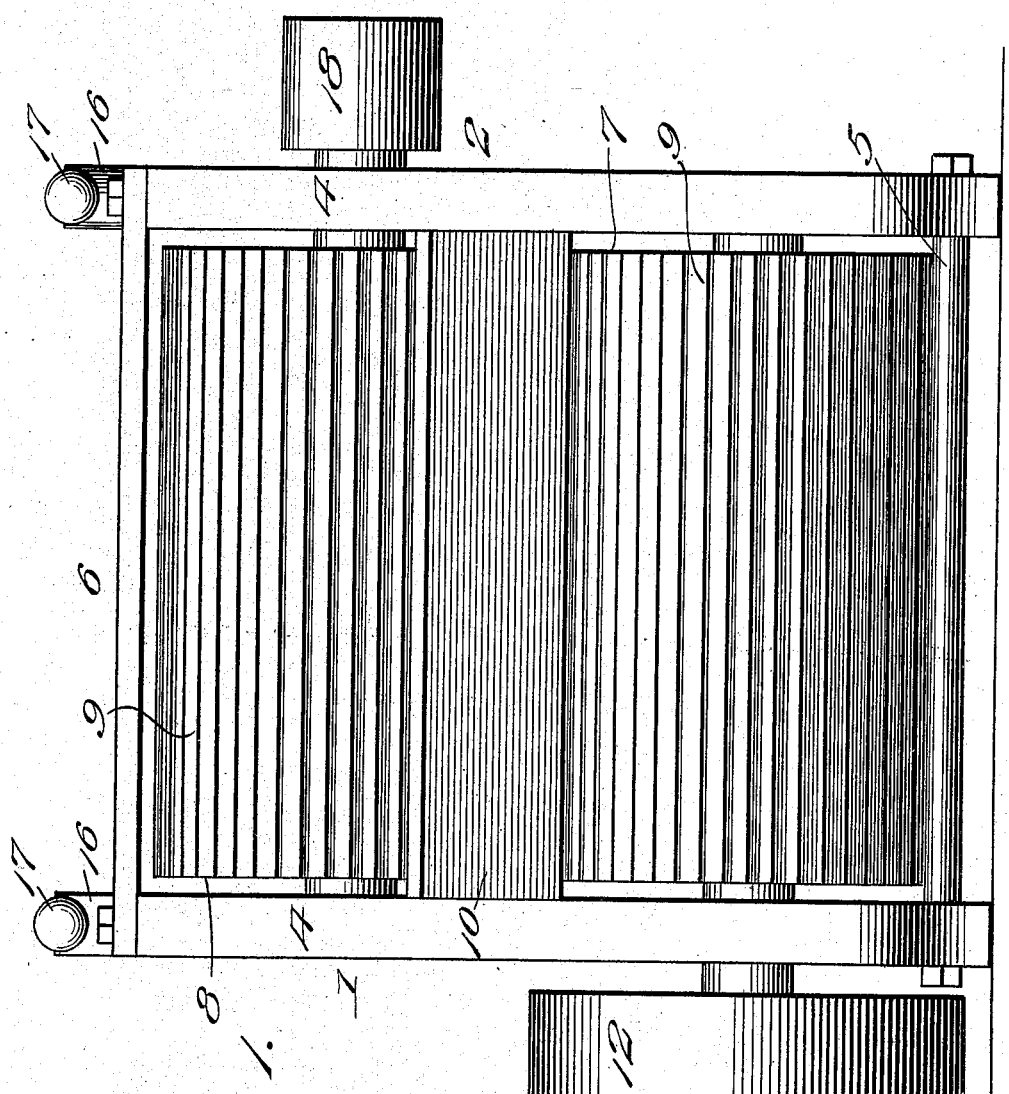
Witnesses
Edwin F. McKee
C. C. Hines
Inventor
Z. T. Job
By Victor J. Evans
Attorney

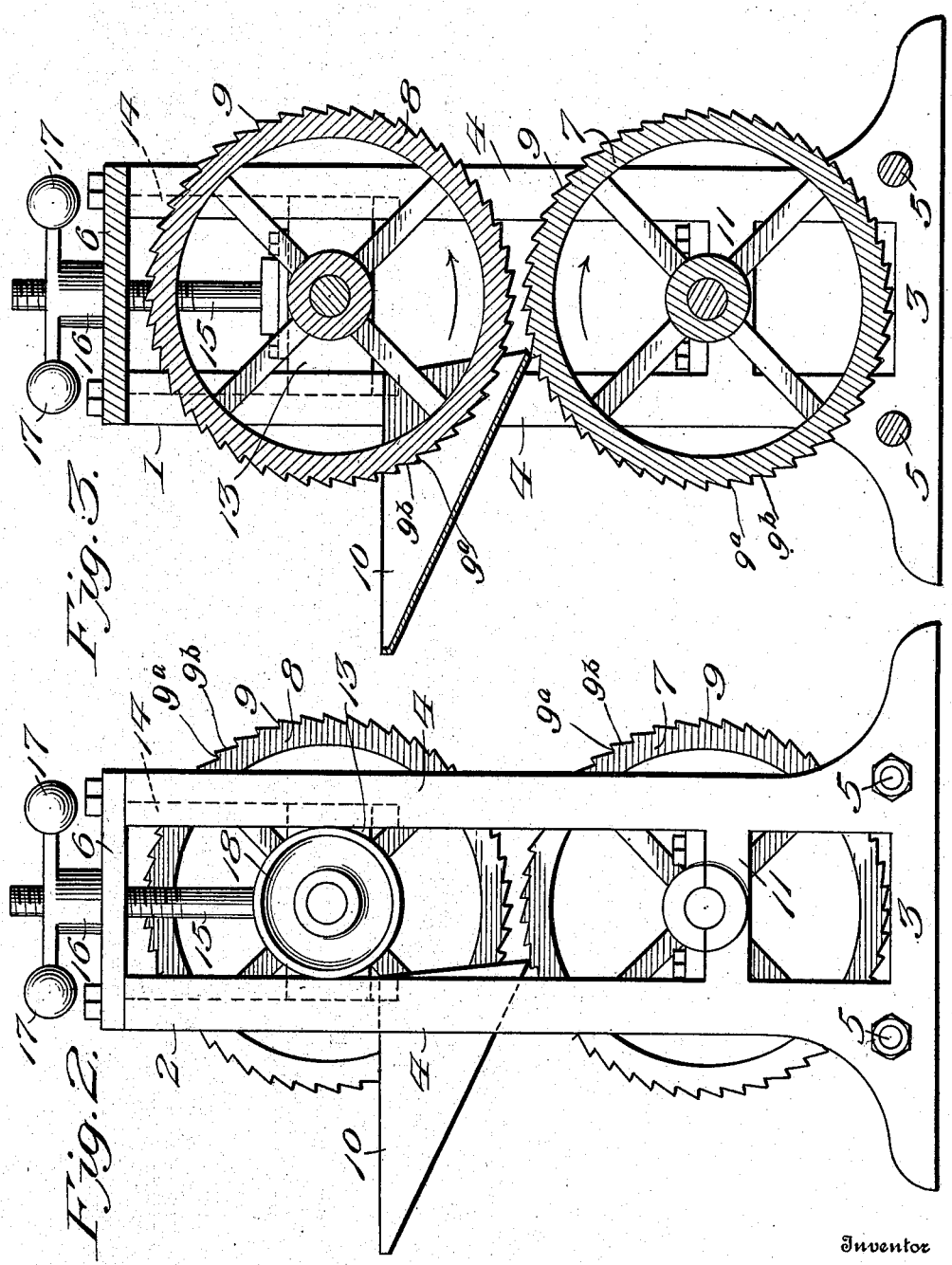

UNITED STATES PATENT OFFICE.

ZACHARY T. JOB, OF ATLANTA, GEORGIA.

COTTON-SEED HULLER.

No. 885,758.   Specification of Letters Patent.   Patented April 28, 1908.

Application filed September 12, 1906. Serial No. 334,338.

*To all whom it may concern:*

Be it known that I, ZACHARY T. JOB, a citizen of the United States of America, residing at Atlanta, in the county of Fulton and State of Georgia, have invented new and useful Improvements in Cotton-Seed Hullers, of which the following is a specification.

This invention relates to an apparatus for hulling cotton seed, the object of the invention being to provide a simple and inexpensive construction of apparatus which will operate to rapidly and efficiently hull the seed without injury thereto and in such a manner as to leave the hulls and body of the seed in condition to be readily separated.

With the above and other objects in view, the invention consists of the novel construction, combination and arrangement of parts hereinafter fully described and claimed, reference being had to the accompanying drawings, in which:—

Figure 1 is a rear elevation of a huller embodying my invention. Fig. 2 is a side elevation of the same. Fig. 3 is a central vertical front to rear section.

The frame of the apparatus may be of any preferred construction, but, as shown, comprises side pieces 1 and 2, each composed of a base 3 having guide standards 4 rising therefrom. Tie bolts 5 connect the bases 3 of the two frame pieces, while the upper ends of said frame pieces are connected by a transverse head plate 6 suitably fastened thereto.

Mounted in the frame is a pair of rolls 7 and 8, the lower roll 7 constituting a feed roll and the upper roll 8 a hulling roll. The periphery of each roll is provided with longitudinal teeth 9, each tooth having a straight or abrupt face or shoulder 9$^a$ and a beveled face 9$^b$ forming at their junction point a cutting edge 9$^c$, the beveled face of each tooth extending to the base of the shoulder of the adjacent tooth. The rolls rotate in opposite directions toward the front of the machine, as indicated by the arrows in Fig. 3, and the teeth of the rolls 7 face rearwardly or reversely to its direction of rotation, while the teeth of the roll 8 face forwardly or in the direction of rotation thereof. A hopper 10 is supported upon the rear portion of the frame with its discharge end located between the adjoining faces of the two rolls at a suitable distance in rear of a vertical line coincident with their axes, the bottom of the hopper being inclined to feed the seed by gravity. The shaft of the lower or feed roll 7 is journaled in bearings on cross pieces 11 connecting the standards of each frame piece and is provided at one end with a pulley 12 for communicating power thereto. The shaft of the roll 8 is journaled in bearings 13 which are arranged to slide vertically in guideways 14 in the standards, so as to permit of the adjustment of said roll toward and from the roll 7. Connected with the bearings 13 are upwardly extending rods 15 which slide through openings in the head plate 6 and are threaded for the reception of holding and adjusting nuts 16. These nuts rest upon the head plate and are provided with oppositely extending handles 17 by which they may be adjusted to raise and lower the bearings 13. The rolls may be geared together to operate at the different rates of speed hereinafter specified, but are preferably independently driven, the shaft of the roll 8 being provided with a pulley 18 whereby motion may be communicated thereto independently of the roll 7.

In operation, the roll 7 is preferably revolved at a relatively low speed, say, one-hundred revolutions per minute, and the roll 8 at a much higher rate of speed, say, eighteen hundred revolutions a minute. The seed feeding from the hopper 10 passes between the rolls and is held in the pockets formed by the teeth of the feed roll 7, which carries the seed through the rolls. As the seed feeds through the rolls the cutting edges of the teeth of the roll 8 engage the exposed portions of the hulls thereof and cut and rip open the same, this operation being effectively secured by the described arrangement of the teeth of the roll and the action of the rolls in revolving in opposite directions. Through this mode of operation and method of treatment, and by mounting the roll 8 so that it may be adjusted relative to the roll 7 to suit the specific sizes of the seed being hulled, the hulls may be removed without injury to the body of the seed and so as to leave the seed in such a condition that the hulls and bodies may be readily and conveniently separated.

It will be observed that by the described construction and arrangement of the cutting teeth of the two rolls, coöperating longitudinal cutting edges on the two rolls are not only formed, but the beveled faces of the teeth of roll 7 on the highest point of the periphery of said roll will form shelves to receive and support the seed dropping from the hopper 10, which seed will roll into contact with the shoulders 9ᵃ and project upwardly above the cutting edges of the next adjacent teeth in the path of revolution of the roll, whereby the cutting points of the teeth on the roll 8 on account of the greater speed of rotation of said roll will be caused to come into contact with the seed, resulting in the rapid and cleanly severing of the seed into halves. By this means crushing of the seed will be prevented, and at the same time the hulls will be quickly and cleanly stripped therefrom. This construction and mode of operation is, therefore, of obvious advantage in hulling cotton seed, in that any crushing action of such seed should be prevented in order to retain and prevent waste of the oil for a subsequent expressing operation. The particular arrangement of the hopper 10 is of advantage in this connection, as the seed is discharged by gravity in such a manner as to prevent them from falling through the space between the meeting portions of the peripheries of the rolls and at such a point in rear of the axial line of the rolls as to permit the seed to properly seat on the beveled faces of the lower roll before they are engaged and cut by the teeth on the upper roll.

Having thus described the invention, what is claimed as new, is:—

1. In a cotton seed huller the combination with a feeding roll having means thereon for receiving the seed in thin layers and for retaining said seed in place thereon, means for rotating said roll, a hulling roll adjacent said feeding roll, said hulling roll having cutting teeth thereon adapted to strike the top of the seed held on the feeding roll and to cut a portion of the hull thereof, and means for rotating the hulling roll.

2. In a cotton seed huller, the combination with an upper cutting roll, of a lower feeding roll in proximity and parallel thereto, means for driving the cutting roll at a high rate of speed, and means for driving the feeding roll in the opposite direction at a slower rate of speed, means for feeding cotton seed in a layer to the lower roll whereby the said seed will remain thereon by gravity and will be carried by said roll between the two rolls to be operated upon by the cutting roll, said lower roll having longitudinal teeth projecting therefrom to hold the seed in position thereon, and said upper roll having longitudinal cutting teeth thereon opposite the teeth on the lower roll.

3. In a cotton seed huller, the combination with a feed roll provided with pockets in its surface of such depth that cotton seed placed therein will project beyond the surface, of a parallel superposed cutting roll having cutting teeth adapted to approach the lower roll so closely as to strike and cut the tops of the seed held in the pockets, and means for rotating said rolls at relatively different rates of speed.

4. A cotton seed huller comprising a frame, a lower feed roll journaled therein and provided with longitudinally extending teeth facing reversely to its direction of rotation, an oppositely rotating superposed hulling roll provided with longitudinally extending cutting teeth facing in its direction of rotation, the teeth upon each roll being each provided with an abrupt shoulder and an inclined or beveled face leading therefrom to the base of the shoulder of the next adjacent tooth, means for rotating said rolls at relatively low and high rates of speed, and a hopper supported in rear of the rolls with its outlet arranged to discharge the seed upon the upper portion of the feeding roll in rear of the axial line of the roll.

In testimony whereof, I affix my signature in presence of two witnesses.

ZACHARY T. JOB.

Witnesses:
J. M. DAVIS.
H. MIMS.